United States Patent
Droitcour et al.

(10) Patent No.: US 11,650,560 B2
(45) Date of Patent: *May 16, 2023

(54) DUAL MODE SYSTEM FOR DETECTING OCCUPANCY OF A ROOM

(71) Applicants: Amy Diane Droitcour, Arlington, MA (US); Chenyan Song, Honolulu, HI (US)

(72) Inventors: Amy Diane Droitcour, Arlington, MA (US); Chenyan Song, Honolulu, HI (US)

(73) Assignee: Adnoviv Inc., Honolulu, HI (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/510,154

(22) Filed: Oct. 25, 2021

(65) Prior Publication Data

US 2022/0043416 A1  Feb. 10, 2022

Related U.S. Application Data

(63) Continuation of application No. 16/857,585, filed on Apr. 24, 2020, now Pat. No. 11,181,878.

(Continued)

(51) Int. Cl.
*G01S 13/00* (2006.01)
*G05B 19/042* (2006.01)
(Continued)

(52) U.S. Cl.
CPC ............ *G05B 19/042* (2013.01); *F24F 11/63* (2018.01); *G01S 13/04* (2013.01); *G01S 13/86* (2013.01); *F24F 2120/10* (2018.01); *G05B 15/02* (2013.01); *G05B 2219/2614* (2013.01); *G05B 2219/45016* (2013.01)

(58) Field of Classification Search
CPC .................. G05B 19/042; G05B 15/02; G05B 2219/2614; G05B 2219/45016; G01S 13/04; G01S 13/86; G01S 13/56; F24F 11/63; F24F 2120/10; F24F 11/61
See application file for complete search history.

(56) References Cited

U.S. PATENT DOCUMENTS

| 10,620,307 B2 * | 4/2020 | Yavari .................... G01S 13/86 |
| 2006/0111878 A1 * | 5/2006 | Pendyala ........... G06Q 10/0875 705/29 |

(Continued)

OTHER PUBLICATIONS

Abedi, Milad, and Farrokh Jazizadeh. "Deep-learning for occupancy detection using Doppler radar and infrared thermal array sensors." Proceedings of the International Symposium on Automation and Robotics in Construction (IAARC). May 2019. (Year: 2019).*

*Primary Examiner* — Michael D Masinick
(74) *Attorney, Agent, or Firm* — Plager Schack LLP; Mark H. Plager; Alexis J. Saenz

(57) ABSTRACT

A method and system improve on the accuracy of and power consumption of occupancy detection systems. Embodiments may provide a dual mode system that includes a passive infrared sensor with low power consumption and a RADAR-based sensor with higher power consumption that is only powered when the system determines a room is occupied with the passive sensor and no new movement is detected after a threshold duration.

10 Claims, 4 Drawing Sheets

Related U.S. Application Data

(60) Provisional application No. 62/840,028, filed on Apr. 29, 2019.

(51) Int. Cl.
*G01S 13/04* (2006.01)
*G01S 13/86* (2006.01)
*F24F 11/63* (2018.01)
F24F 120/10 (2018.01)
G05B 15/02 (2006.01)

(56) References Cited

U.S. PATENT DOCUMENTS

| | | | |
|---|---|---|---|
| 2006/0149586 A1* | 7/2006 | Brown | G06Q 50/12 |
| | | | 235/382 |
| 2013/0024029 A1* | 1/2013 | Tran | A61B 5/0205 |
| | | | 700/278 |
| 2015/0286948 A1* | 10/2015 | Luca | F24F 11/30 |
| | | | 706/48 |
| 2017/0123058 A1* | 5/2017 | Yavari | G01S 13/86 |
| 2018/0096576 A1* | 4/2018 | Anderholm | G01S 13/886 |
| 2019/0096220 A1* | 3/2019 | Anderholm | G08B 21/0476 |
| 2020/0341440 A1* | 10/2020 | Droitcour | G01S 13/86 |
| 2021/0103044 A1* | 4/2021 | Droitcour | G01S 13/581 |

* cited by examiner

DUAL MODE SYSTEM FOR DETECTING OCCUPANCY OF A ROOM

CROSS-REFERENCE TO RELATED APPLICATIONS

This application claims benefit under 35 U.S.C. § 119(e) of U.S. application Ser. No. 16/857,585 filed Apr. 24, 2020, which claimed priority to U.S. Provisional Application having Ser. No. 62/840,028 filed Apr. 29, 2019, which are hereby incorporated by reference herein in its entirety.

BACKGROUND

The embodiments herein relate generally to detection systems, and more particularly, to a dual mode system for detecting occupancy of a room.

Commonly used occupancy sensors do not adequately the detect presence of sedentary people, who are for example reading or typing. This misdetection can lead to lights and HVAC switching systems off while a room is occupied. People have to wave and stand to get the system to acknowledge their presence and turn the systems back on. Because of this annoyance, users often either disable the occupancy sensors or use them with very long time delays. The energy savings are thus less than they could be with a more accurate occupancy sensor.

Some systems use a RADAR-based sensor. However, standalone RADAR systems are too power-hungry which may be impractical to use when a room occupancy detector is operated by battery. As may be expected, the battery life is short-lived and may require frequent battery replacement.

SUMMARY

In one aspect of the subject technology, a system for detecting occupancy in a room is disclosed. The system includes an infrared sensor, a RADAR based sensor, and a processor. The processor is connected to the infrared sensor and connected to the RADAR based sensor. The processor is configured to: receive a signal from the infrared sensor detecting movement in the room, determine whether a first threshold duration has passed since a most recent signal from the infrared sensor detecting movement in the room has been received, trigger operation of the RADAR based sensor based on the first threshold duration having passed since the most recent signal from the infrared sensor detecting movement in the room was received, wherein the RADAR based sensor is on for a second threshold duration that is less than the first duration; and determine whether the RADAR based sensor detects a presence of a person in the room, turn off the RADAR based sensor in response to at least one of: detecting the presence of a person in the room, or not detecting the presence of a person in the room during the second threshold duration, and switch back to receiving the signal from the infrared sensor.

In another aspect, a system for detecting occupancy in a room is disclosed. The system includes an infrared sensor, a RADAR based sensor, and a processor. The processor is connected to the infrared sensor and connected to the RADAR based sensor. The processor is configured to: receive, by a processor, a signal from an infrared sensor detecting movement in the room; determine, by the processor, whether a first threshold duration has passed since a most recent signal from the infrared sensor detecting movement in the room has been received; trigger, by the processor, operation of a RADAR based sensor based on the threshold duration having passed since the most recent signal from the infrared sensor detecting movement in the room was received; and determine, by the processor, whether the RADAR based sensor detects a presence of a person in the room. In response to the RADAR based sensor detecting a presence of a person in the room, the processor deactivates the RADAR based sensor and checks the infrared sensor again for movement in the room. The processor determines whether a second threshold duration has passed since the RADAR based sensor detected the presence of a person in the room in the event the infrared sensor does not detect movement in the room, and re-activates the RADAR based sensor.

In yet another aspect, a method for detecting occupancy in a room is disclosed. The method includes operating an infrared sensor to detect a presence of a person in the room. The operation of the infrared sensor draws a first power level from a battery. A processor receives a signal from the infrared sensor detecting movement in the room. The processor determines whether a first threshold duration has passed since a most recent signal from the infrared sensor detecting movement in the room has been received. The processor triggers operation of a RADAR based sensor based on the first threshold duration having passed since the most recent signal from the infrared sensor was received. Operation of the RADAR based sensor draws a second power level from the battery that is substantially higher than the first power level. The processor determines whether the RADAR based sensor detects a presence of one or more persons in the room or an absence of persons in the room. Operation of the RADAR based sensor is changed into a sleep mode in response to the RADAR based sensor detecting the presence of one or more persons in the room or the absence of persons in the room. The sleep mode draws less power than the first power level and substantially less power than the second power level. The infrared sensor is operated again to detect movement in the room, drawing the first power level from the battery.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
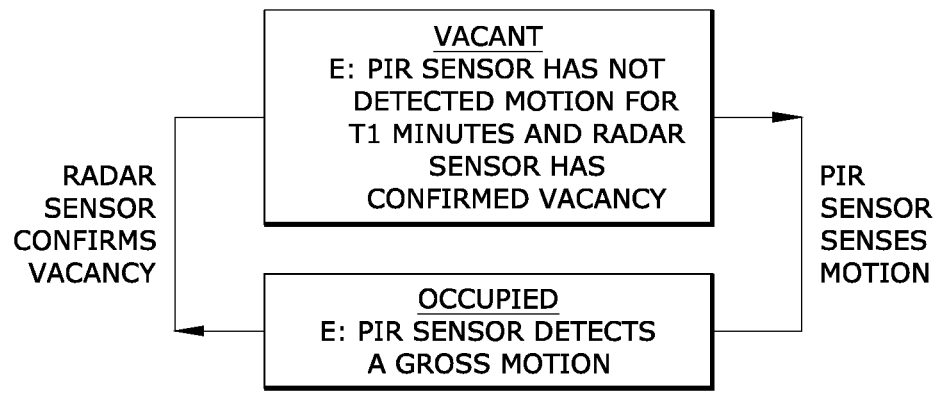
FIG. 1 is a flowchart of a method for operating a dual mode system for detecting occupancy in a room in accordance with an embodiment of the subject technology.

Broadly, embodiments of the subject technology increase the accuracy of occupancy detection while providing costeffective use of energy to power occupancy detection systems. In general, the subject technology uses a dual mode system which uses a low energy consuming detector until conditions warrant the use of a higher energy consuming detector to verify occupancy or the lack there of. In an exemplary embodiment, the system includes an infrared sensor and a RADAR based sensor. The infrared sensor consumes less power to operate than the RADAR based detector. FIG. 1 shows a process for detecting occupancy of a room according to an exemplary embodiment. The infrared sensor may be the default detection element and may be in operation until, for example, the infrared sensor does not detect movement in the room for a threshold duration (T1). In response to the infrared sensor not detecting the presence of a person in the room, the RADAR based sensor may be triggered to turn on. If the RADAR based sensor confirms that the room does not register movement, the system may confirm the room is vacant. Rooms in a vacant state may have resources connected to the room turned off (for example, lights, heating/air conditioning, etc.). In the vacant state, the infrared sensor may operate and if the infrared sensor detects motion, the system may determine the room is occupied and may assume the room remains occupied until the infrared sensor has not registered movement again for the threshold duration and the RADAR based sensor confirms whether or not the room is vacant.

In the description below, embodiments may determine whether a person in the room is exhibiting gross or large motion or is sedentary, if present at all. Gross or large motion may refer to body movement that includes movement of the whole body (for example, walking about), movement of appendages (for example, waving arms, raising hands, stretching). Sedentary or stationary people may refer to persons that are seated or standing and whose detectable motion is primarily breathing without gross or large motion activity. Sedentary activity may include short range activity (for example, speaking, typing, head movements, finger movements, etc.).

Figure 3:
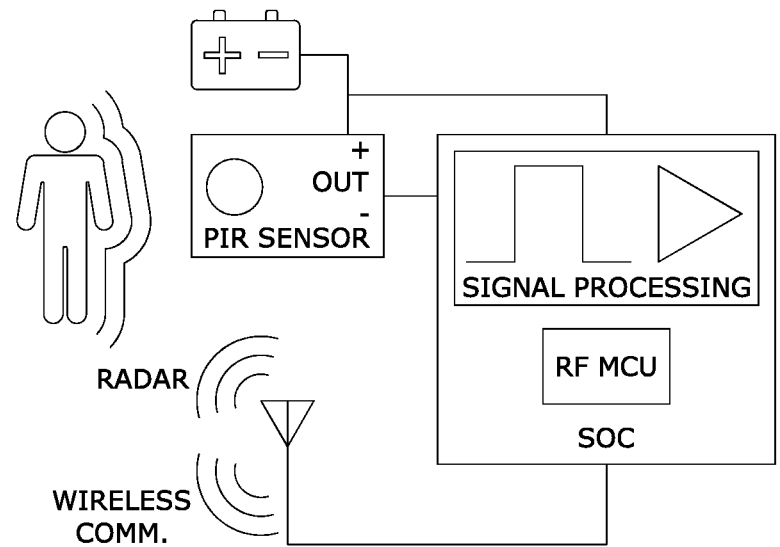
FIG. 3 is a block diagram of a dual mode system for detecting occupancy in a room using a system on chip architecture in accordance with another embodiment of the subject technology.
Figure 2:
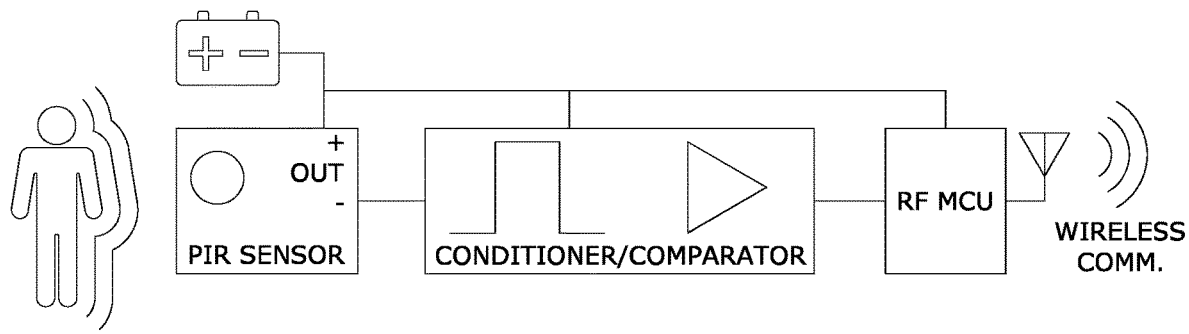
FIG. 2 is a block diagram of a dual mode system for detecting occupancy in a room in accordance with an embodiment of the subject technology.

Referring now to FIG. 2, a dual mode system for detecting occupancy in a room is shown according to an exemplary embodiment. In some embodiments, the infrared motion sensor may be passive, which thus consumes less power. The infrared sensor may be referred to as the PIR sensor (passive infrared) in the description below, however it will be understood that in some embodiments, other infrared, other passive sensors, or other lower power consumption sensors may be used. In some embodiments, the system may be adjunct to the operating elements of the room. The system may have its own power source, for example, a battery. The system may include a processor (for example, a microcontroller (MCU)) connected to the infrared sensor and to the RADAR based sensor. In some embodiments, the processor may be located on a system on chip module (SOC) (See FIG. 3) which may provide a conveniently small package for controlling the detection system. In other embodiments, the processor is part of a larger computing device.

The RADAR based sensor may be a continuous wave Doppler type that can sense respiratory motion. Operation of a Doppler RADAR sensor may be as follows: in some embodiments, a single-ended RADAR may be used, and in other embodiments, a quadrature RADAR may be used. The system may digitize the signal phase shift, which is related to the motion in the room. In some embodiments, signal conditioning circuitry filters this data to isolate the frequency range in which physiological signals (respiration, heartbeat) and their first few harmonics are present. In other embodiments, the signal conditioning performs anti-aliasing filtering and/or removes DC offsets. In some embodiments, both types of signal conditioning (isolating the frequency range and anti-aliasing) may be used. These conditioned signals are digitized and used for analysis.

Generally speaking, the RADAR based sensor may operate for a specific amount of time, and then may be deactivated until the system indicates it should be powered again. When a time has passed after the PIR detector has sensed motion, the Doppler RADAR sensor may be used to determine whether the room is vacant or if it is occupied by a stationary person.

Once the presence of a stationary person is confirmed, the system may assume that the room continues to be occupied by a sedentary person until the PIR detects a large motion. Once the room is confirmed vacant by the RADAR based sensor, the system may assume that the room remains vacant until the PIR sensor detects large motion. Utilizing the assumption that, for example, a large motion is required for a person to enter or exit the room, the RADAR based sensor may be used minimally. Because the RADAR based sensor consumes far more power than the PIR sensor, minimizing the frequency with which the RADAR based sensor is used is helpful to reduce the system's power consumption such that battery operation is possible.

Figure 4:
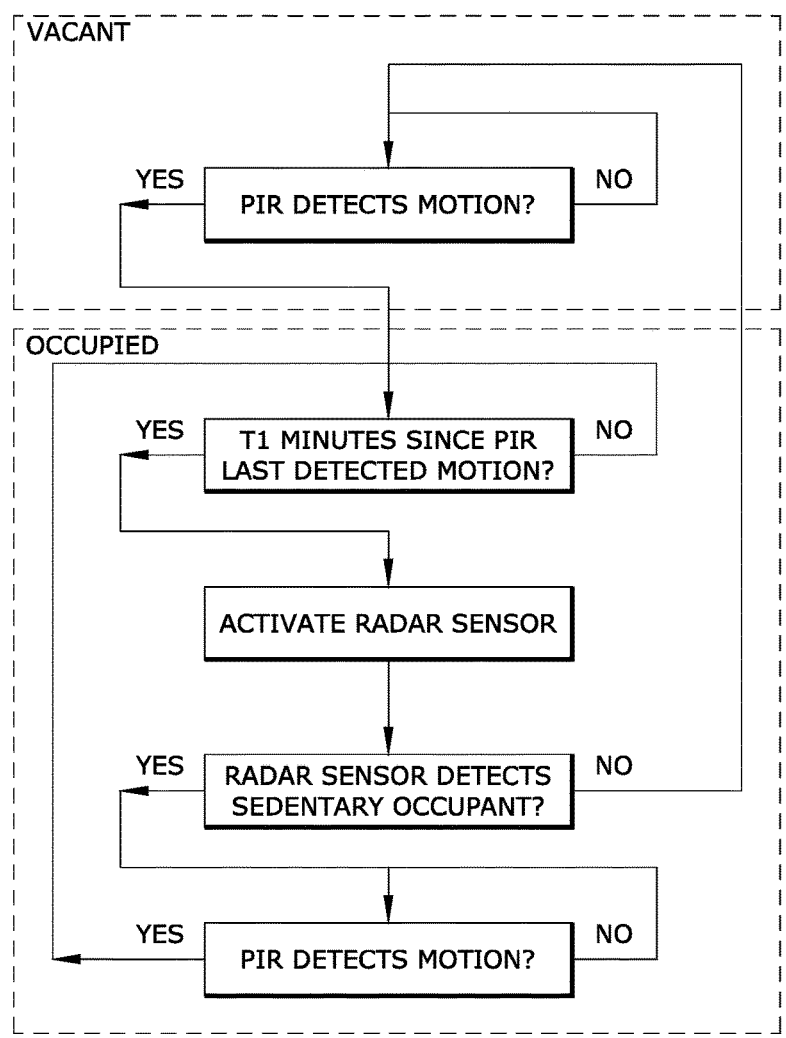
FIG. 4 is a flowchart of a method for detecting occupancy in a room in accordance with an embodiment of the subject technology.

Referring now to FIG. 4, a method of detecting occupancy in a room is shown according to an exemplary embodiment. Generally, the method determines whether a room being monitored is in an occupied or vacant state. The infrared sensor may be continuously operating checking for motion. Until the infrared sensor detects motion, the room may be considered vacant. Once movement is detected, the process may assume that a person is in the room. The process may continue to check for motion detected by the infrared sensor. If motion is not detected for a threshold time (which may be an adjustable setting) (T1) after the previous (most recent) movement detected, the process may trigger activation of the RADAR based sensor. If the RADAR based sensor does not detect movement, the process may signal that the room is vacant. The RADAR based sensor may be turned off and the method may resume monitoring signals from the infrared sensor. If the RADAR based sensor detects movement, the room may be flagged as occupied. In some embodiments, the RADAR based sensor may be turned off when the room is occupied, and the method may resume using the infrared sensor to detect gross motion in the room before checking again with the RADAR based sensor.

Figure 5:
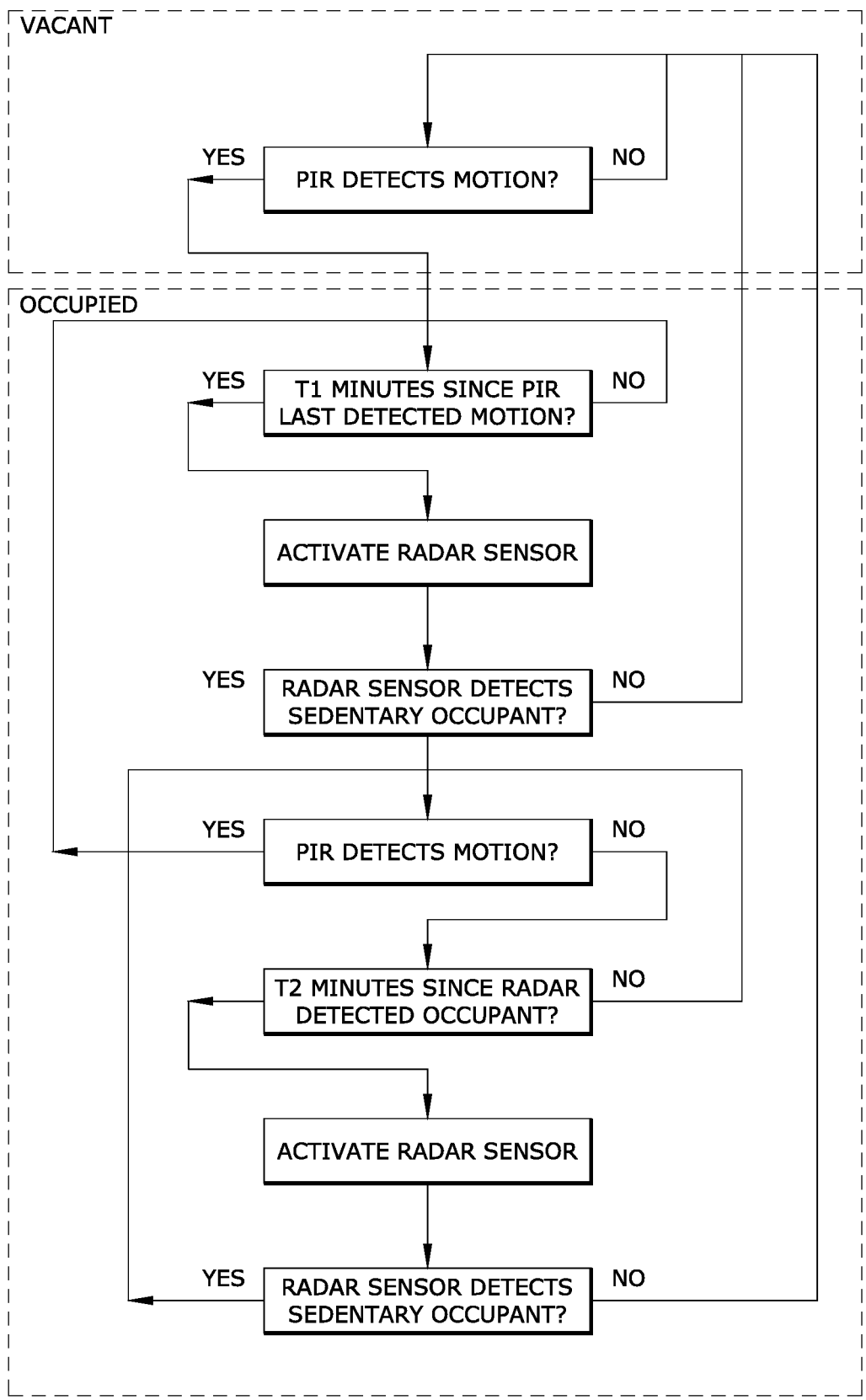
FIG. 5 is a flowchart of a method for detecting occupancy in a room in accordance with another embodiment of the subject technology.

As will be appreciated, the RADAR based sensor may detect more subtle movements such as breathing when people are sedentary in a room at the expense of higher power consumption. Referring now to FIG. 5, a method for detecting occupancy in a room is shown according to another embodiment. The method in FIG. 5 is similar to the method in FIG. 4 except that after the RADAR based sensor detects an occupant, the system periodically uses the RADAR based sensor to confirm that the room is still occupied by a sedentary occupant.

In the method, if there has been at least T1 minutes since the PIR sensor last sensed motion, the room may be flagged as vacant if the RADAR based sensor has been activated since then and has not sensed any occupants. In the vacant state, only the PIR sensor is active, and the other components may be in a low power "sleep mode" to reduce power consumption (for example, as shown seen in FIG. 6). If the PIR sensor detects motion, the state becomes "Occupied—PIR." Otherwise, the state remains "Vacant".

In the Occupied—PIR state, the PIR sensor has sensed motion within the last period T1. When the PIR senses motion, the processor activates to log the motion and starts a clock on T1. Each time the PIR sensor detects motion, the clock on T1 may reset. When a time T1 has passed since the PIR sensor last detected motion, the RADAR sensor is activated. If the RADAR based sensor detects the presence of a person, the state becomes "Occupied-Radar." If the RADAR based sensor does not detect the presence of a person, the state becomes "Vacant".

In the Occupied—Radar state, it has been at least T1 minutes since the PIR sensor has sensed motion, and the last RADAR based sensor measurement indicates the presence of a person. In this state, the PIR sensor may remain active. If the PIR sensor detects motion, the state returns to Occupied-PIR state. In some embodiments, when in the Occupied—RADAR state, if the PIR sensor does not detect motion, for T2 minutes after the RADAR detected an occupant, the RADAR based sensor is activated again to confirm the presence of a sedentary person. (T2>T1) If the RADAR based sensor detects presence, the method may remain in this state, with the timer for T2 reset. If the RADAR based sensor does not detect motion, the state may change to vacant. In other embodiments, if the RADAR based sensor does not detect motion, it may repeat the measurement, and if neither measurement detects the presence of a person, the state may change to vacant.

When the RADAR based sensor is activated, it may be operated for a period T3, in which multiple breathing cycles can be detected. In some embodiments, T3 may be 30 seconds. In some embodiments, T3 may be one minute. In some embodiments T3 may be 15 seconds. The interval T3 may be selected to optimize power consumption versus accuracy of detection.

Figure 6:
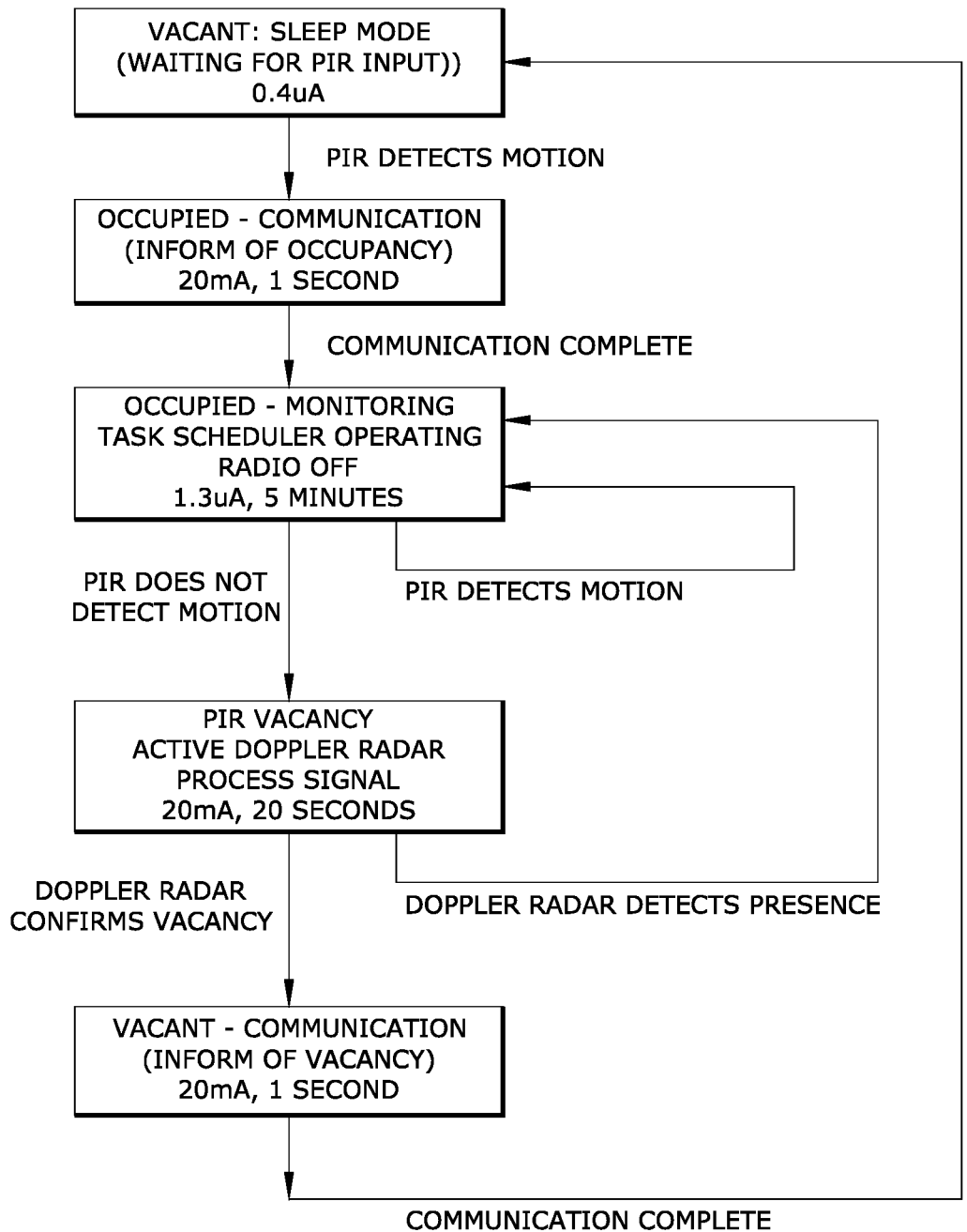
FIG. 6 is a flowchart of a method for detecting occupancy in a room in accordance with another embodiment of the subject technology.

Referring now to FIG. 6, an embodiment of a state machine for a processor is illustrated. When the state is vacant, the processor is in a "sleep mode" waiting for an input from the PIR sensor. The current consumption in "sleep mode" is very low, for example 0.4 uA.

When the system enters the OCCUPIED state, an indication of occupancy may be transmitted via the communication/control circuitry. When the system enters the VACANT state, an indication of vacancy may be transmitted via the communication/control circuitry. In some embodiments, the status is periodically sent in the absence of the status change in a "handshake" with the unit with which it is communicating.

When the PIR sensor detects motion and wakes the processor, the processor communicates the new "occupied" state via Wi-Fi, and the power consumption during communication may become 20 mA, but communication is only needed for about 1 second.

Following communication, the processor may move into a "monitoring" state. The task scheduler is active. The processor may time how long it has been since the most recent indication of motion from the PIR sensor. The current consumption in "monitoring" mode is for example, 1.3 uA. In the embodiment described, this state lasts 5 minutes from the most recent PIR signal.

After the 5 minutes from the most recent PIR signal, the system may enter the "PIR Vacancy" state. The RADAR and signal processing may be activated, and current consumption is about 20 mA. This state lasts for 20 seconds in this embodiment. The processor analyzes the RADAR signal and if respiration is detected, the state returns to the "monitoring" state. If respiration is not detected, the state returns to the "vacant" state, and the change in state is communicated.

In some embodiments, the computing device controlling the system may operate the processes described above in the general context of computer system executable instructions, such as program modules, being executed by a computer system. The computing device may typically include a variety of computer system readable media. Such media could be chosen from any available media that is accessible by the computing device, including non-transitory, volatile and non-volatile media, removable and non-removable media. The system memory could include random access memory (RAM) and/or a cache memory. A storage system can be provided for reading from and writing to a non-removable, non-volatile magnetic media device. The system memory may include at least one program product having a set (e.g., at least one) of program modules that are configured to carry out the functions of embodiments of the invention. The program product/utility, having a set (at least one) of program modules, may be stored in the system memory. The program modules generally carry out the functions and/or methodologies of embodiments of the invention as described above.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects "system." Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processing unit of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for detecting occupancy in a room, comprising:
   an infrared sensor;
   a RADAR based sensor; and
   a processor connected to the infrared sensor and connected to the RADAR based sensor, wherein the processor is configured to:
      receive a signal from the infrared sensor detecting movement in the room, determine whether a first threshold duration has passed since a most recent signal from the infrared sensor detecting movement in the room has been received, trigger operation of the RADAR based sensor based on the first threshold duration having passed since the most recent signal from the infrared sensor detecting movement in the room was received, wherein the RADAR based sensor is on for a second threshold duration that is less than the first duration; and determine whether the RADAR based sensor detects a presence of a person in the room, turn off the RADAR based sensor in response to at least one of:
  detecting the presence of a person in the room, or
  not detecting the presence of a person in the room during the second threshold duration, and
switch back to receiving the signal from the infrared sensor.

2. The system of claim 1, wherein the processor is further configured to confirm through the RADAR based sensor that the room is vacant after the second threshold duration has passed since the most recent signal from the infrared sensor detecting movement in the room has been received.

3. The system of claim 2, wherein the processor is further configured to control an environmental load connected to the room to operate based on the confirmation that the room is vacant.

4. The system of claim 1, wherein the processor is further configured to deactivate the RADAR based sensor when the room is in an occupied state as determined by RADAR based sensor.

5. The system of claim 4, wherein the processor is further configured to reactivate the RADAR based sensor when the infrared sensor senses a large motion and then does not detect the presence of the person in the room after the second threshold duration.

6. A system for detecting occupancy in a room, comprising:
  an infrared sensor;
  a RADAR based sensor; and
  a processor connected to the infrared sensor and connected to the RADAR based sensor, wherein the processor is configured to:
    receive, by a processor, a signal from an infrared sensor detecting movement in the room;
    determine, by the processor, whether a first threshold duration has passed since a most recent signal from the infrared sensor detecting movement in the room has been received;
    trigger, by the processor, operation of a RADAR based sensor based on the threshold duration having passed since the most recent signal from the infrared sensor detecting movement in the room was received; and
    determine, by the processor, whether the RADAR based sensor detects a presence of a person in the room;
    in response to the RADAR based sensor detecting a presence of a person in the room, deactivate the RADAR based sensor and checking the infrared sensor again for movement in the room;
    determine whether a second threshold duration has passed since the RADAR based sensor detected the presence of a person in the room in the event the infrared sensor does not detect movement in the room, and
    re-activate the RADAR based sensor.

7. The system of claim 6, wherein the processor is further configured to confirm through the RADAR based sensor that the room is vacant after the second threshold duration has passed since the most recent signal from the infrared sensor detecting movement in the room has been received.

8. The system of claim 7, wherein the processor is further configured to control an environmental load connected to the room to operate based on the confirmation that the room is vacant.

9. The system of claim 6, wherein the processor is further configured to deactivate the RADAR based sensor when the room is in an occupied state as determined by RADAR based sensor.

10. The system of claim 6, wherein the processor is further configured to reactivate the RADAR based sensor when the infrared sensor senses a large motion and then does not detect the presence of the person in the room after a second threshold duration.

* * * * *